United States Patent
King et al.

(10) Patent No.: US 11,008,235 B2
(45) Date of Patent: *May 18, 2021

(54) FLOATING DISPENSERS

(71) Applicant: KING TECHNOLOGY INC., Hopkins, MN (US)

(72) Inventors: Joseph A. King, Wayzata, MN (US); Paul Freeberg, South St. Paul, MN (US); Jeffrey D. Johnson, Edina, MN (US); Lyle Enderson, Elk River, MN (US); Donald Dalland, Mantorville, MN (US); Terry Goeman, Minnetonka, MN (US)

(73) Assignee: KING TECHNOLOGY INC., Hopkins, MN (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/932,790

(22) Filed: Apr. 24, 2018

(65) Prior Publication Data

US 2019/0322557 A1    Oct. 24, 2019
US 2020/0399153 A9    Dec. 24, 2020

Related U.S. Application Data

(60) Division of application No. 14/756,312, filed on Aug. 25, 2015, now Pat. No. 10,017,402, which is a (Continued)

(51) Int. Cl.
*B01F 1/00* (2006.01)
*B01F 13/00* (2006.01)
(Continued)

(52) U.S. Cl.
CPC ............ *C02F 1/688* (2013.01); *B01F 1/0027* (2013.01); *B01F 13/0049* (2013.01);
(Continued)

(58) Field of Classification Search
CPC ................ B01F 1/0027; B01F 13/0049; B01F 2215/0052; C02F 1/505; C02F 1/68;
(Continued)

(56) References Cited

U.S. PATENT DOCUMENTS

2008/0217258 A1*  9/2008  Buchan ................... C02F 1/688
                                                                  210/747.5
2011/0089121 A1*  4/2011  Van Der Meijden ... C02F 1/688
                                                                  210/749

* cited by examiner

*Primary Examiner* — Lucas A Stelling
(74) *Attorney, Agent, or Firm* — Johnson & Phung LLC

(57) ABSTRACT

A floating dispenser having an external float or an internal float for supporting a cartridge or cartridges for floatingly delivering a dispersant or dispersants to a body of water with the floating dispenser having cartridges rotationally positionable with respect to one another to control the rate of dispensing while the dispenser floats in an upright condition with the floating dispenser changing its flotation orientation in response to consumption of the dispersant or dispersants in the a cartridge to thereby provide a visual alert to replace a spent cartridge with a fresh cartridge. In addition, the inventions described herein permit changing the dispensing nature of the system from a multiple dispensing system to a single dispensing system without changing the floating characteristics of the floating dispensers through replacement of a dispersant in one of the cartridges with an inert or ballast material that has no effect on the water characteristics.

5 Claims, 3 Drawing Sheets

Related U.S. Application Data division of application No. 13/573,246, filed on Sep. 4, 2012, now Pat. No. 9,174,177, which is a continuation-in-part of application No. 13/507,114, filed on Jun. 5, 2012, now Pat. No. 8,999,259.

(60) Provisional application No. 61/627,526, filed on Oct. 13, 2011, provisional application No. 61/627,528, filed on Oct. 13, 2011, provisional application No. 61/687,001, filed on Apr. 16, 2012.

(51) Int. Cl.
*C02F 1/50* (2006.01)
*C02F 1/68* (2006.01)
*C02F 1/76* (2006.01)
*E04H 4/12* (2006.01)
C02F 103/42 (2006.01)

(52) U.S. Cl.
CPC ...... *C02F 1/766* (2013.01); *B01F 2215/0052* (2013.01); *C02F 2103/42* (2013.01); *C02F 2201/008* (2013.01); *C02F 2303/04* (2013.01); *E04H 4/1281* (2013.01)

(58) Field of Classification Search
CPC .. C02F 1/687; C02F 1/688; C02F 1/76; C02F 1/766; C02F 2103/42; C02F 2201/008; C02F 2303/04; E04H 4/1281
See application file for complete search history.

US 11,008,235 B2

FLOATING DISPENSERS

CROSS REFERENCE TO RELATED APPLICATIONS

This application is a divisional application of application Ser. No. 14/756,312 filed Aug. 25, 2015 titled Floating Dispensers, which is a divisional application of application Ser. No. 13/573,246 filed Sep. 4, 2012 titled Floating Dispensers (now U.S. Pat. No. 9,174,177), which claims priority from provisional application Ser. No. 61/627,526 filed Oct. 13, 2011 and Ser. No. 61/627,528 filed Oct. 13, 2011 and is a continuation-in-part of Ser. No. 13/507,114 filed Jun. 5, 2012 (now U.S. Pat. No. 8,999,259), which claims priority from provisional application 61/687,001 filed Apr. 16, 2012.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of floating dispensers for delivering a dispersant or dispersants to a body of water is known in the art. In one type of floating dispensers the dispensers contain a halogen and float upright in a body of water until the halogen is consumed whereupon the dispenser flops on its side. In another type of dispenser the dispenser sinks to the bottom of the pool and remains there until the dispersant has been consumed at which time the dispenser floats to the top of the pool to alert the operator to replace the dispenser. In another type of a floating dispenser a nondissolvable weight, such as a marble, is included in the dispenser with the dispenser floating on its side when the dispersant is consumed. As the dispenser floats on its side the marble rolls along the interior of the dispenser and transfers the weigh to the end of the dispenser causing to dispenser to invert after the dispersant is consumed.

SUMMARY OF THE INVENTION

A floating dispenser having an external float or an internal float for supporting a cartridge or cartridges for floatingly delivering a dispersant or dispersants to a body of water with the floating dispenser having cartridges rotationally positionable with respect to one another to control the rate of dispensing while the dispenser floats in an upright condition. In some cases the floating dispenser changes its flotation orientation in response to consumption of the dispersant or dispersants in the a cartridge to thereby provide a visual alert to replace a spent cartridge with a fresh cartridge which can be done by removing the spent cartridge from the dispenser and attaching the fresh cartridge to the floating dispenser. While the dispensers shown herein are suitable for use in pools spas and the like other uses may be found by those in the water treatment field. In addition the inventions described herein permit changing the dispensing nature of the system from a multiple dispensing system to a single dispensing system without changing the floating characteristics of the floating dispensers through replacement of a dispersant in one of the cartridges with an inert or ballast material that has no effect on the water characteristics.

DESCRIPTION OF THE PREFERRED EMBODIMENT

Figure 1:
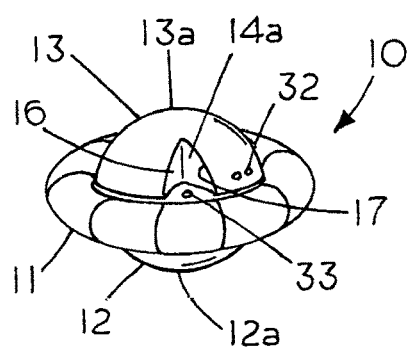
FIG. 1 is a perspective view of a spherical floating dispenser.

FIG. 1 shows a perspective view of a spherical floating status-indicating dispenser 10 for use in pools, spas or other bodies of water that require water treatment such as killing harmful organisms in the water or affecting other characteristics of the water by releasing a dispersant therein. Dispenser 10 comprises two hemispherical cartridges 12 and 13, which are floatingly supported by a floatation ring 11 extending around the outer circumferential region of cartridges 12 and 13. The first hemispherical dispensing cartridge or cap 13 having a circular base and a pole region 13a and the second hemispherical dispenser similarly, having a hemispherical cartridge or cap 12 having a pole region 12a. FIG. 1A shows a perspective view of the hemispherical cartridge 13 revealing a circular base 14 having a pie shaped section removed therefrom and a central extension 19 extending from a central axis of the dispensing cartridge 12 while FIG. 1B shows a side view of the hemispherical cartridge 13.

Figure 1C:
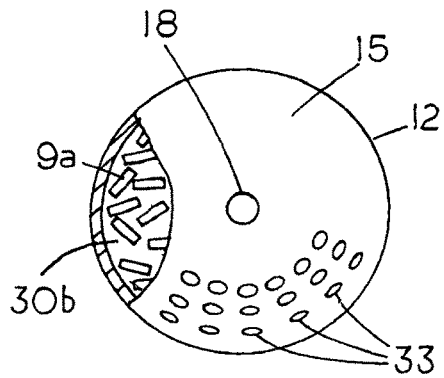
FIG. 1C is a top Figure is a top view of the bottom hemispherical dispensing cartridge of the floating dispenser of FIG. 1.
Figure 1A:
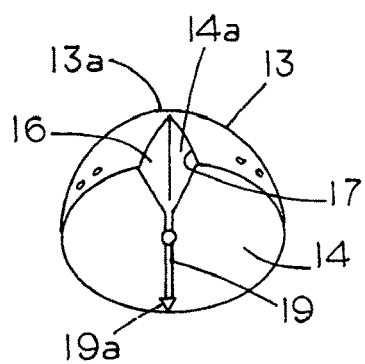
FIG. 1A is a perspective view of a top hemispherical dispensing cartridge of the floating dispenser of FIG. 1.
Figure 1D:
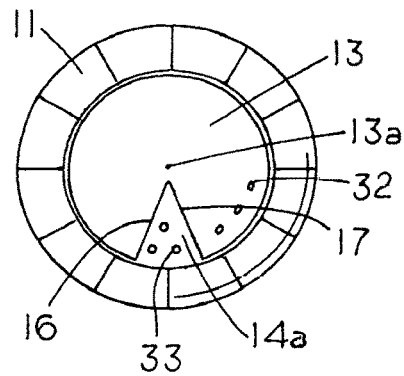
FIG. 1D is a top view of the floating dispenser of FIG. 1.
Figure 1B:
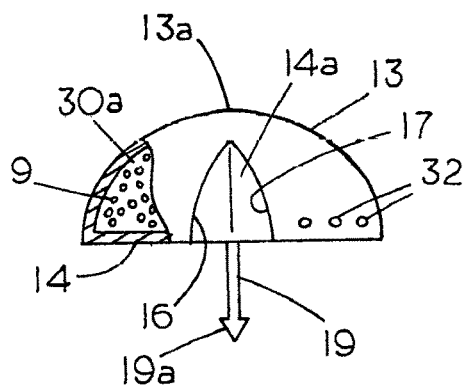
FIG. 1B is a side view of the hemispherical dispensing cartridge of FIG. 1A.

FIG. 1, FIG. 1A and FIG. 1B show that the first hemispherical cap or cartridge 13 contains a chamber 30a and a set of fluid openings 32 for ingress and egress of water to chamber, 30a, which for example, may contain a batch of minerals 9 for delivering metal ions into a body of water. Examples of minerals usable in dispensers may be found in U.S. Pat. No. 6,500,334, which is hereby incorporated by reference. Chamber 30a may be used to hold other materials including inert items, which are used for ballast in the dispenser 10 when the dispenser is changed from a dual dispensing mode to a single dispensing mode. Located on the underside of cap 13 is the elongated extension 19 and a tapered head 19a that can be used to engage and rotationally secure hemispherical cartridge 13 to hemispherical cartridge 12 through a base-to-base relationship that permits one to rotate cartridge 12 with respect to cartridge 13 to select an appropriate dispensing rate. Typically, extension 19 holds the base 15 of cartridge 12 and base 14 of cartridge 13 in frictional engagement with each other to inhibit accidental rotation of cartridge 12 with respect to cartridge 13. The purpose of limiting rotation between the two cartridges 12 and 13 to is use the static position of the base cartridge 13 with respect to the openings 33 in cartridge 12 as a means to select the number of openings 33 or the water flow through the openings located within a substantially hemi lune shaped gap 14a, which is formed between a substantially radial face 16 and a substantially radial face 17 of cartridge 13. By selecting the openings 33 or the flow area one can control the flow of water into and out of dispensing cartridge 12 and consequently the dispersant rate if the dispensing cartridge contains a water sensitive dispersant. Examples of water sensitive dispersants includes minerals for releasing metal ions and other materials that can be dispersed into the water to affect the water characteristics although no limitation to materials that can effect the water characteristics is intended since the dispensing cartridge may in some instances be used for holding other types of dispersant materials that do not impact the water characteristics. On the other hand the openings 32 in dispensing cartridge may be fixed since the selection of openings in cartridge 12 allows one to coordinate the dispensing rates of the dispersants in cartridge 12 and cartridge 13.

An example of use of a different type of material which can affect the delivery of dispersants from the floating dispenser but not the operation of the floating dispenser is the placement of inert materials or ballast in dispenser 12 which may be done without departing from the spirit and scope of the invention. That is ballast materials having a specific gravity greater than one, such as sand or the like, may be placed in cartridge 13 if one wishes to convert the dual dispensing system to a single dispensing system without affecting the flotation characteristics of the system. By employing a set of dispensing cartridges 12 and 13 that contain different materials one allows the user to replace one dispensing cartridge with another. For example, in one application a user may require minerals or the like that deliver metal ions, which are delivered from minerals contained in dispensing cartridge 13 and in another application the source of metal ions may not be required. The user can switch dispensing cartridge 13, which contains minerals, for a dispensing cartridge that contains an inert material or ballast. Alternately, one has the option of using the compartment that normally contains the minerals for holding other water dispersants or extra halogen, which can lengthen the operational life of the dispenser. The replacement of a batch of minerals with a ballast allows the spherical dispenser to functionally float in the same manner without delivering a second dispersant into the body of water. In some cases one may use inert ballast and in other cases one may use active ballast such as limestone, which has lesser effect on the water treatment than the combination of minerals such as limestone and silver chloride.

FIG. 1C shows the second hemispherical cap or cartridge 12 revealing the circular top surface or base 15 with a set of openings 33 therein for ingress and egress of water to cartridge 12. A reference to FIG. 1 reveals how only those openings 33, which are located in the space provided by lune shaped gap 14a, permit fluid communication to and from the materials in the dispensing cartridge 12. FIG. 1C shows a cutaway view of hemispherical cap 12 revealing a chamber 30b containing a plurality of halogen tablets or pucks 9a. While halogen tablets are shown as the dispensable materials other dispensing materials may be used therein without departing from the spirit and scope of the invention.

The use of floating dispensers allows for insitu treatment of a body of water by placing the dispenser directly in the body of water, which allows the material to be delivered to the body of water through the contact of the water with the dispensers. In some cases two or more materials may be used in a chamber of the dispenser with one dispensable material having a long-term dissolution rate and the other dispensable material having a rapid dissolution rate. For example, one can place alum together with a batch of minerals in one compartment. The alum, which dissipates quickly acts as a clarifier, while the minerals continue to deliver silver ions to the body of water over an extended period of time which can be weeks or months. Thus, the invention includes the method of using a floating dispenser to deliver two or more water affecting materials, which change the water characteristics, from the same compartment, one a short term dispersant and the other a long term dispersant. Another example, of using the floating dispenser compartment to deliver two dispersants or water affecting materials is the placement of dichlor (Dichloroisocyanuric acid) and trichlor (Trichloroisocyanauric acid) in the same compartment to achieve both a rapid and an extended water treatment. That is, the dichlor dissipates quickly and provides a shock treatment to the body of water while the trichlor release of chlorine into the body of water occurs over an extended period of time. In addition to the use of two dispersants the invention allows the carrying and delivery of multiple dispersants in the dispensing compartment. For example, one may place a chelator such as copper sulfate, a clarifier and zinc in the dispenser.

Base 15 of dispensing cartridge 12 includes a central located pocket 18 for receiving and axially restraining extension 19a while permitting rotation of the extension 19 along a central axis extending through extension 19 and through dispensing cartridge 12 and 13. When the hemispherical cap 13 and the hemispherical cap 12 are in axial alignment and engaged with each other as shown in FIG. 1 they form a spherical floating dispenser 10 which is supported by an annular flotation collar 11 that is circumferentially external to the floating dispenser 10.

FIG. 1 shows the first hemispherical cap 13 includes a substantially hemi lune shaped gap 14a formed between a set of substantially radial faces 16 and 17 in the first hemispherical cap 13. The hemispherical cap 13, which is rotatable with respect to the second hemispherical cap 12, enables an operator to control the open water flow area through the selection of the open fluid ports 33 to the chamber 30a.

Extending circumferentially in an equatorial position around the hemispherical dispensing cartridge 12 and hemispherical dispensing cartridge 13 is the annular flotation collar 11, which is secured to one or the other of the cartridges, preferably at the base of the cartridges to provide flotation to the cartridges 12 and 13 when they are assembled as shown in FIG. 1. FIG. 1D is a top view showing the annular flotation member 11 extending around the dispensing cartridge 13 to maintain both the cartridges in a condition where water can come into contact with the contents of the dispensing cartridges as they are supported by flotation ring 11. The flotation ring 11 may be an inflatable ring or a solid buoyant material that has sufficient buoyancy so as to support the dispensing cartridge 12 and the dispensing cartridge 13 when both cartridges contain a dispersant. The flotation ring should support cartridge 12 and cartridge 13 at a level where the openings 32 in dispensing cartridges 13 and the openings 33 in dispensing cartridges 12 are located below a water line to ensure that water comes into contact with the materials located in the chambers of the floating dispenser 10.

In the example shown in FIG. 1 the hemispherical dispensing cartridges 12 and 13 are the same size with extension 19 holding the dispensing cartridges in a rotatable condition with respect to each other. The substantially hemi lune shaped opening 14a providing means for selecting the size of an open region in spherical cap 13 and for uncovering more or less ports 33 in the base 15 of spherical cap 12. FIG. 1C shows a partial cutaway view of dispensing cartridges revealing the chamber 30b therein with the dispersant 9a comprising pucks or tablets 9a of a halogen. In the assembled condition the circular face or base 15 of dispensing cartridge 12 and the circular base or face 14 of dispensing cartridge 13 are located in a face-to-face condition with each other.

Figure 2:
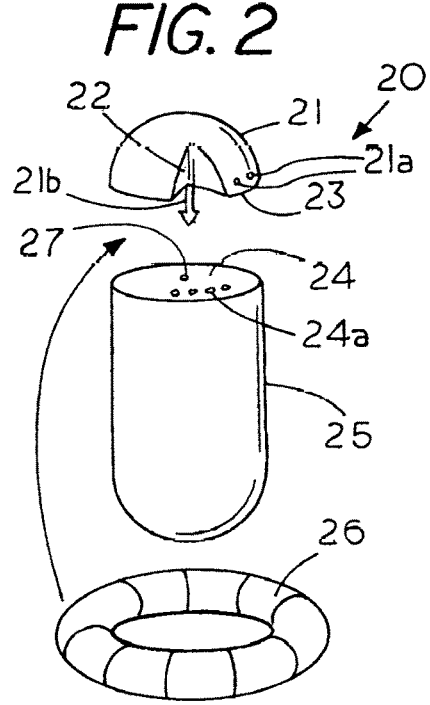
FIG. 2 is an exploded view of cylindrical floating dispenser with hemispherical end caps.

While FIG. 1 shows dispensing cartridges of the same size FIG. 2 shows an example of a floating dispenser 20 where the floating dispenser includes dispensing cartridges of unequal size. In this example, the top hemispherical dispensing cap 21 includes a substantially hemi lune shaped gap 22 and a circular base 23 for forming face-to-face engagement with a top base 24 of the elongated cylindrical dispensing cartridge 25 in a manner identical to the dispensing cartridge 13 of FIG. 1. The dispensing cartridge 25 typically may be used for holding a halogen such as chlorine or bromine. In this example an extension 21b on dispensing cap 21 fits within a pocket 27 in an identical manner to the extensions and pocket of the floating dispenser 10, which allows the larger dispensing cartridge 25 to be interchanged with the dispensing cartridge 12 of dispenser 13. Top base 24 of dispensing cartridge 25 includes openings 24a which provide egress and ingress to a chamber therein. The larger dispensing cartridge permits more material to be held therein and thus can extend the operational life of the dispenser. To compensate for the additional material the flotation collar 26 provided for dispensing cartridge may contain more flotation than the flotation collar 11.

FIG. 2 shows the annular floatation collar 26 that attaches to the exterior of dispensing cartridge 25 to hold at least a portion of the top dispensing cartridge 21 containing openings 21a below a waterline. While floating dispenser 20 permits one to extended the dispensing life of the dispensers since the larger capacity of dispensing cartridge 25 allows one to hold a larger amount of halogen in the dispensing cartridge 25, the rotational top hemispherical cap 21 also offers the user the flexibility to select the amount of dispersant from dispensing cartridge 21 since in some applications one may require more dispersant than in other applications.

As shown the annular flotation member 26, which can be attached to the upper part of cartridge 25, provides flotation for both of the dispensers 21 and 25. The flotation member may be adhesively secured to the cartridge 25, however, other means may be used to secure the flotation member 26 to the dispensing cartridge 21 or 25 in a position where the openings 21a and openings 24a remain below the water line.

Figure 3:
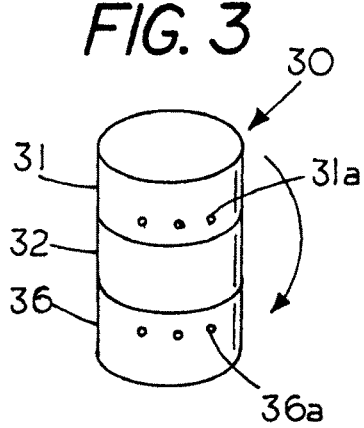
FIG. 3 is a perspective view of a cylindrical floating dispenser with cylindrical end caps.

FIG. 3 shows an example of another floating dispenser 30 with three identical but separate cylindrical members located in an end-to-end condition. In this example, a first cylindrical dispensing cartridge 31, which has water openings 31a, may contain a dispersant such as minerals, a second cylindrical member or floatation chamber 32, and a third cylindrical dispensing cartridge 36, which has water openings 36a may contain a halogen. In this example when the halogen such as bromine is consumed the center of gravity of the floating dispenser shifts. That is while the weight of the material in the first dispensing material i.e. such as minerals or ballast, does not dissolve, the consummation of the halogen causing the center of gravity of the dispenser 30 to shift from the bottom cartridge to the top cartridge which causes the dispenser 30 to invert with the cylindrical dispenser 36 containing the empty halogen chamber appearing above the water line rather than the cylindrical chamber containing the minerals or ballast. By selecting different colors for the cylindrical dispenser cartridge 31 and 36 one can provide a visual indication that the halogen has been spent. For example, cartridge 31 with the nondissolvable materials, i.e. minerals or ballast, may be blue and the dispenser cartridge 36 may be red so that when the floating dispenser 30 inverts the appearance of the red cartridge 36 above the water line alerts an operator to replace the spent dispenser cartridge 36 in the floating dispenser 30. While not shown dispensing cartridges 31 and 36 may be connected to floatation chamber 32 in the identical manner that dispensing cartridge 12 connects to dispensing cartridge 13.

Figure 4:
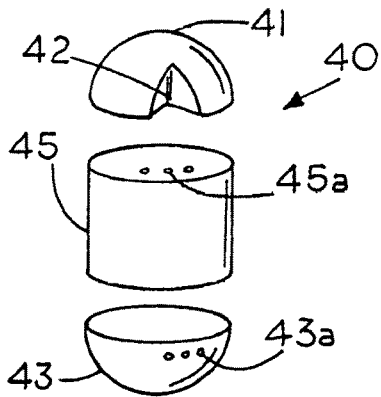
FIG. 4 is an exploded view of a floating dispenser with three compartments and hemispherical end caps.

FIG. 4 shows another example of a floating dispenser 40 with three members. In this example the top member comprises a hemispherical cap 41 with a lune shaped gap 42 with the top member having an internal flotation chamber. Located below the hemispherical cap 41 is a cylindrical member 45 for containing a dispersant such as halogen and having openings 45a. Located below dispenser 45 is a second hemispherical cap 43 having openings 43a forming a mineral dispenser. In this example each of the members are secured to an adjacent member to form a single dispenser with the top spherical cap 41 rotatable with respect to middle dispenser 45 to control the open area of ports therein (not shown) to thereby control the amount of water coming into contact with the halogen in the halogen dispenser 45. Floating dispenser 40 is characterized as a non-inverting dispenser since the dispenser remains in the same vertical orientation during the consumption of the halogens since the both the dispensing chamber and the halogen chamber are located below the water line. If desired floating dispenser 40 may be converted to a dispenser that changes its orientation through consumption of a dispersant or through position of a flotation chamber within dispenser 45. With the floating dispenser 40 an operator has the option of changing the dispensing cartridge 45 to a flotation cartridge while hemispherical cap 41 and 43 become dispenser cartridges for water treatment materials. Floating dispenser 40 may then become an inverting dispenser similar to the floating dispenser 30 shown in FIG. 3.

Figure 5:
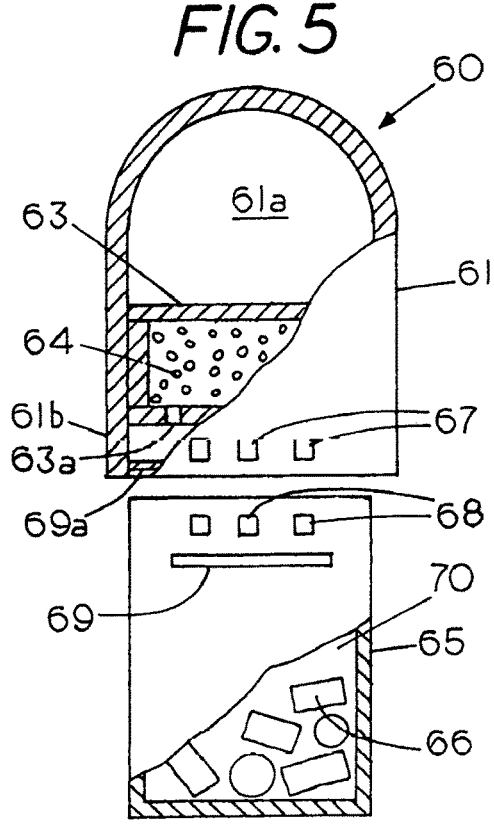
FIG. 5 is a partial sectional view of a floating dispenser.

FIG. 5 shows a floating dispenser 60 comprising an upper member 61 having a buoyant chamber 61a for buoyantly supporting floating dispenser 60 in a body of water such as a pool or spa and a lower member 65 holding a dispersant 66, such as a halogen therein. The lower portion of dispenser top 61 includes an annular lip 61b with a set of openings 67 that can be aligned with a set of openings 68 that extend into a chamber 70 in the member 65. Member 65, which is shown partially in section includes a cylindrical chamber 70 for holding a dispersant such as a halogen 66. A ridge 69 on member 65 engages a groove 69a in the annular lip 61b to hold top member 61 in rotational engagement with member 65. Rotation of member 61 with respect to member 65 aligns more or less of openings 68 with openings 67 to thereby control the amount of water that contact the dispersant in member 65. Through the use of an container or pouch 63 the floating dispenser 60 can be converted to dispenser that delivers two dispersants rather than one dispersant or can also be converted into an inverting dispenser that inverts if only a single dispersant is present in dispenser 60. In this example, a pouch 63 is inserted into dispenser top 61. The pouch 63 has a set of openings 63a and may contain a second dispersant such as minerals, which release metal ions, or the pouch 63 may contain an inert or ballast material 64. The pouch 63 may be rigid or soft and may be held therein through frictional engagement. In either case the floating dispenser can be converted from a dispenser that flops when empty to a dispenser that inverts when the dispersants therein are spent. If the pouch contains a source of metal ions the conventional one dispersant dispenser becomes a two dispersant dispenser.

Figure 5A:
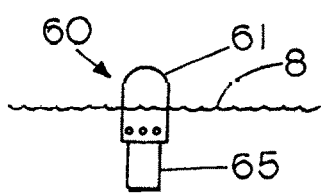
FIG. 5A shows the floating dispenser of FIG. 5 floating in an upright condition.
Figure 5B:
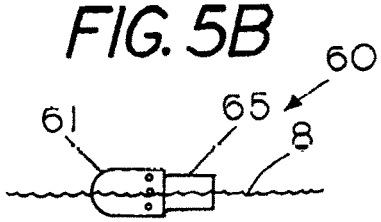
FIG. 5B shows the floating dispenser of FIG. 5 floating in a horizontal floating condition.
Figure 5C:
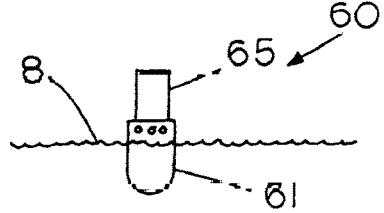
FIG. 5C shows the floating dispenser of FIG. 5 floating in an inverted condition.

A reference to FIG. 5A, FIG. 5B and FIG. 5C reveals the operation of dispenser 60 after a pouch or container has been inserted into dispenser 60. FIG. 5A shows the dispensing cartridge 61 in a full condition with the dispenser 60 floating in an upright condition with dispensing cartridge 65 located below the water line 8, which is the interface between the water and the atmosphere. As the dispersant in dispenser 60 dissipates, the floating dispenser reaches a point where the dispensing cartridge 60 floats on its side as shown in FIG. 5B. This would be the normal flop condition for dispenser 60 if the pouch or container was not present in dispenser 60. However, with the pouch containing a ballast or dispersant that delivers a water treatment material without decreasing the mass of the dispersant, i.e. minerals or other materials that deliver metal ions. As the dispersant 66 continues to dissipate the dispenser 60 reaches a condition where the dispersant in the dispenser cartridge has been consumed. In this condition the ballast 64 which was above the center of gravity of the dispenser 60 when the dispenser contained a dispensable material would now be below the center of gravity of dispenser 60 causing dispenser 60 to invert to the condition shown in FIG. 5C. Thus, through the addition to a pouch or container containing a second material the dispenser 60 can be converted from a flopping dispenser to an inverting dispenser that alerts a person that the dispenser needs a refill through the end for end inversion of the dispenser.

Figure 5D:
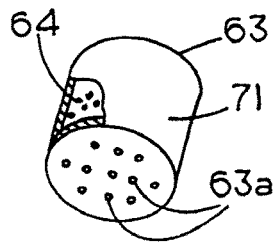
FIG. 5D is an isolated view of an insertable ballast or dispersant container.

FIG. 5D shows an isolated view of the container or pouch 63 that is inserted into floating dispenser 60 to convert the floating dispenser to either a floating dispenser that simultaneously delivers two dispersants or by selecting the proper weight of material a floating dispenser that will invert 180 degrees. Pouch 63 includes a cylindrical side-wall 71, a material 64 and a set of openings 63a for ingress and egress of water. Alternately, the container or pouch 63 may contain an inert material or a material that has an effect on the water characteristics although the mass of the material remains stable. Examples of such materials include materials that deliver metal ions, such as minerals, which are commonly used in water treatment. Placement of weighted material in an upper chamber of dispenser 60 as illustrated in FIG. 5 may also be used to affect the flotation characteristics of the floating dispenser 60. That is, if the buoyancy of the bottom member without the dispersant therein is greater than the buoyancy of the top member 61 the placement of a consumable dispersant 66 in a lower compartment chamber 70 with the weight of the consumable dispersant greater than the weight of the material in the upper compartment 61 of the dispenser 60 can cause the dispenser 60 to float in the condition shown in FIG. 5A and when the dispersant 66 is consumed the dispenser 60 inverts to the condition shown in FIG. 5C.

Thus the invention includes a method of water treatment of a pool or spa with a flotation dispenser 60 comprises the steps of placing a container 63 of material 64 in a water accessible compartment of a first member 61 of the floatation dispenser 60 wherein the material 64 maintains its mass during a dispensing cycle. Placing a water treatment material 66 such as a halogen in a water accessible compartment 70 of a second member 65 which is securable to the first member 61 with second water treatment material 66 having the characteristic of losing its mass during a dispensing cycle whereby the floating dispenser has a flotation axis in a first orientation when in a full condition as shown in FIG. 5A and a second flotation axis in a visible different orientation (FIG. 5B, FIG. 5C) when the dispersant 66 in the second member loses its mass to the body of water.

Figure 6:
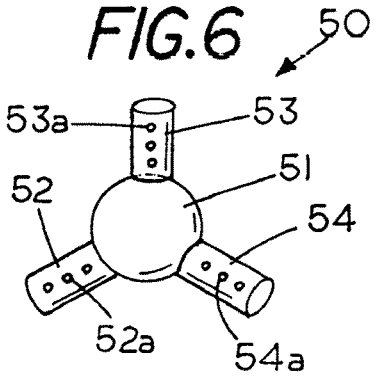
FIG. 6 shows a floating dispenser having a set of spoke cartridges.

FIG. 6 shows an example of another type of floating dispenser i. e. a floating spoke dispenser 50 where the presence of one or more of the spoke cartridges proximate the water line indicates that a spoke cartridge dispenser should be replenished. The floating spoke dispenser 50 comprises a cylindrical or spherical hub 51 forming a central cylindrical float with the hub 51 having a first dispenser cartridge 54, which has openings 54a, in the shape of a cylindrical spoke extending radially outward from one side of hub 51. Similarly a second dispenser cartridge 52, which has openings 52a, and a third dispensing cartridge 53, which has openings 53a with each in the shape of a cylindrical spoke extend radially outward from hub 51 with each of the cylindrical dispensing cartridges preferably located at equal horizontal angles of approximately 120 degrees with respect to an adjacent spoke cartridge. In the example shown, each of the spoke cartridges are of equal size, however, the spoke cartridges may be of different size or located at different angles with respect to each other without departing from the spirit and scope of the invention, however to obtain the benefit of visual observation that a spoke cartridge is empty the spoke cartridge should be positioned so that the vertical angle of the spokes with respect to the horizon becomes visible to an observer when the dispersant therein is consumed. Typically, an angle of 30 degrees allows one to visually determine when a cartridge has been spent. In this example the floating dispenser 50 includes a cylindrical shaped flotation member 51; a first dispensing cartridge 54 extending radially from the flotation member 51; a second dispensing cartridge 52 extending radially from the flotation member 51; and a third dispensing cartridge 53 extending radially from the flotation member 51 with each of the dispensing cartridges having a central axis forming an acute angle with respect to a horizon to enable each of a set of ports 54a, 52a and 53a on each of the dispensing cartridges to be located below a water line 8 when a dispersant is present therein. In this example the spoke cartridges may be rotateably mounted to the hub for removal and insertion of a fresh cartridge.

Figure 7:
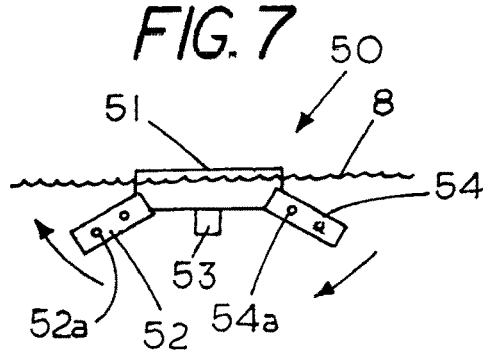
FIG. 7 illustrates the rotation of the floating dispenser of FIG. 6 as the dispersant therein is consumed.

FIG. 7 shows that the three spoke cartridges 52, 53 and 54 each extend radially outward from hub 51 at an acute angle of about 30 degrees with respect to the water line 8. In operation as a typical floating dispenser one of the spoke cartridge 54 may contain minerals, which releases metal ions into the body of water. The release of metal ions has little or no effect on the weight of the minerals in the spoke cartridge 54. The other spoke cartridge 52 may contain a halogen such as bromine, which is dissolvable and dispersible into the body of water and which does have an effect on the weight of the dispensing cartridges 52 and spoke cartridge 53 may contain a third dispersant that is different from the other dispersants 53 or that may be same as another cartridge. Various types of materials may be used in each of the dispensing cartridges depending on the materials needed to affect the characteristics of the water. As the halogen in the spoke dispensing cartridges 52 and 53 are consumed the center of gravity of the floating dispenser 50 changes causing the heavier dispensing cartridge 54 with no consumables to rotate downward toward an under water vertical axis while each of the halogen spoke dispensing cartridges 52 and 53 rotate upward toward the water line 8 as indicated by the arrows. Consequently the position of the spoke cartridges with respect to the water line 8 becomes an indicator of the need to replenish the halogen since the empty spoke cartridges will be visible on or at the water line 8.

Figure 8:
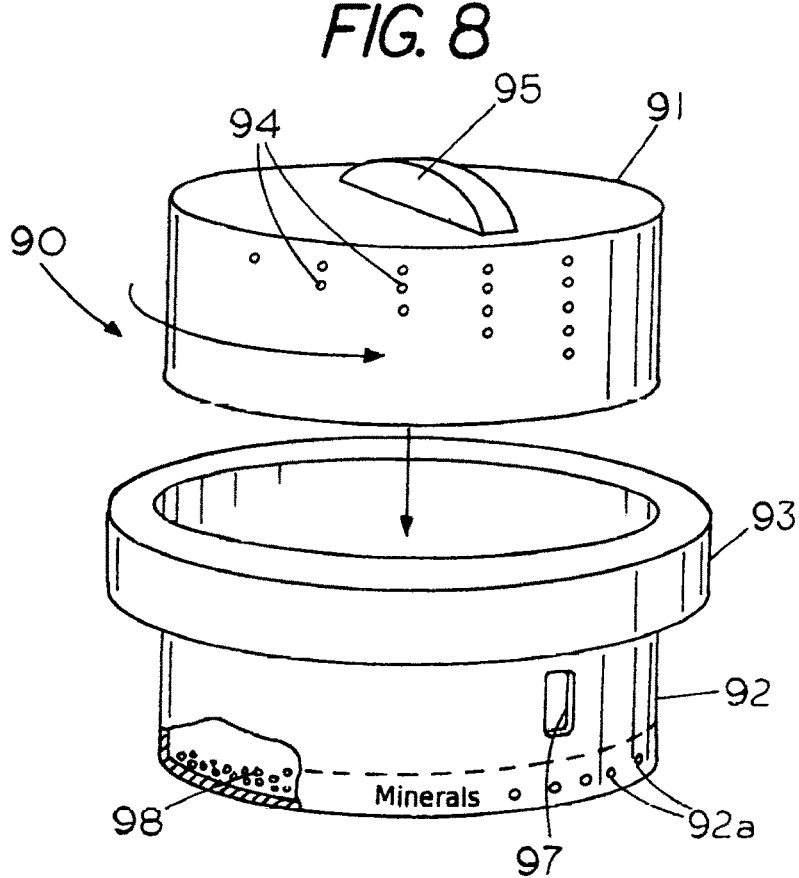
FIG. 8 is an example of a floating dispenser with a replaceable dispenser cartridge.

FIG. 8 shows an exploded view of further embodiment of a floating cylindrical dispenser 90 having a removable cylindrical top-dispensing member 91 having a handle 95 for rotating dispensing member 91 with respect to lower dispenser member 92. Located within dispensing member 91 is a chamber therein for holding a water affecting dispersant such as a halogen with the dispensing member 91 having a set of fluid ports 94 to permit ingress and egress of water. The top cylindrical member 91 is rotateably mounted in a cylindrical opening in the lower dispenser member 92 while the external floatation collar 93, which is located radially outward from the lower dispenser member 92, provides buoyancy to the dispenser 90. In this example the minerals 98 are located in the bottom of lower dispenser member 92 and the center of gravity of the unit remains below the water line whether the halogen chamber is empty or contains a halogen. Means such as shown in FIG. 1B may be used to hold top cylindrical member 91 in a rotatable condition proximate lower dispenser member 92.

To control the flow of water into the chamber in top member 91 one can rotate cylindrical member 91 with respect to lower cylindrical member 92 thereby bringing more or less of openings into an exposed condition in window 97 thus allowing one to control the rate of dispersion of a dispersant such as a halogen through a change in the flow area. The lower cylindrical member 92 includes openings 92a to permit the ingress and egress of water therethrough to enable the dissipation of the metal ions into the water.

Figure 9:
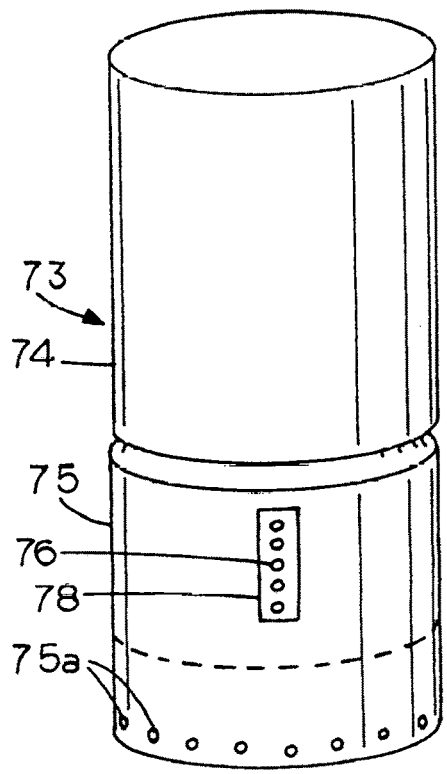
FIG. 9 is an example of a floating dispenser with a replaceable dispenser cartridge.

FIG. 9 shows a further example of a floating cylindrical dispenser 73 having a top cylindrical top member 74 having a replaceable halogen cartridge therein with a set of fluid ports 76 located in window 78 of the lower member 75. The top cylindrical member 74 is rotationally mounted in an opening in the lower member 75. In this example a flotation chamber is located internally in top cylindrical member 74. In this example, the minerals are also located in the bottom of lower dispenser member 75 and the center of gravity of the unit remains below the geometric center whether the halogen chamber is empty or full. Fluid ports 75a permit water to flow into or out of the lower dispenser member 75.

Figure 10:
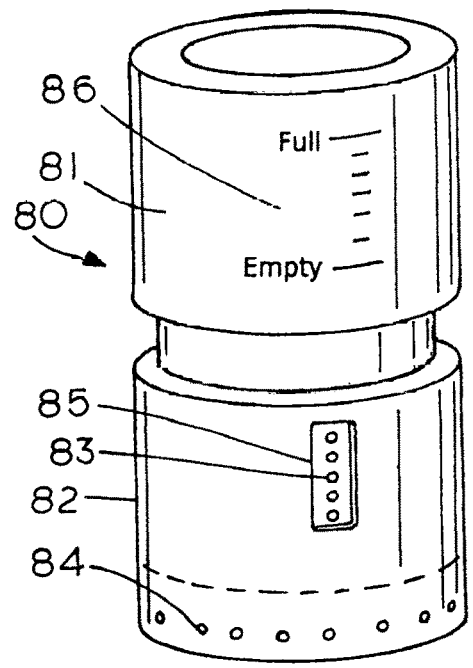
FIG. 10 an example of a floating dispenser with a replaceable dispenser cartridge and a label for floatation alignment with a water line for indicating the amount of undissolved water treatment material in the replaceable dispensing cartridge.

FIG. 10 shows a further example of a floating cylindrical dispenser 80 having a top cylindrical member 81 having a replaceable halogen cartridge (not shown) therein with a set of fluid ports 83 located in window 85 of the bottom cylindrical member 82 to permit water to come into contact with the halogen in top member 81. The top cylindrical member 81 is rotateably mounted in an opening in the lower member 82. In this example a flotation chamber may be located in top cylindrical member 81. The minerals, which release metal ions, are also located in the bottom dispenser 82 of dispenser 80 and the center of gravity of the unit remains below the geometric center whether the halogen chamber is empty or full. To provide an indicating of the status of the halogen in the dispenser the cylindrical face of member 81 includes a set of float lines 86 that can be compared to the water line as the dispenser floats in a body of water. When the halogen is in an undissolved state the float line labeled by "full" will correspond with the water line. As the halogen reaches a dispensed state the float line labeled "empty" corresponds with the water line thus alerting an operator that the halogen chamber should be refilled.

In the embodiments shown two dispensing cartridges are secured to each other to provide a floating dispenser, however, additional dispensing cartridges for other water treatment materials may be incorporated into the floating dispenser without departing from the spirit and scope of the invention.

While the invention has been described in regard to placement of a dispenser containing water affecting materials such as a halogen and minerals other dispersant may be used. If at least one of the water affecting materials is a water dispersible material that dissipates into the water form a container that floats in the body of water the floating condition of the dispenser 80 provides an indication when the dispersible material is spent. While each of the embodiments of FIGS. 8, 9 and 10 contain means for adjusting the delivery of the water affecting characteristics in a body of water such as a pool or spa it should be understood that the floating dispensers described herein may be used in other non-pool or non spa applications where water conditions need correcting.

We claim:

1. A floating dispenser comprising; a flotation member; a first dispensing cartridge; and a second dispensing cartridge rotationally engaged with the first dispensing cartridge with a rotational position of the first dispensing cartridge with respect to the second dispensing cartridge determining a dispersant rate of at least one of the cartridges when the cartridges are floating in a body of water wherein the flotation member and the first dispensing cartridge comprise an insertable pouch containing a material having a specific gravity greater than 1 located in a top position in the floating dispenser and the second dispensing cartridge is located in a bottom position in the floating dispenser, which is below a water line when the floating dispenser is in an unspent state and the second dispensing cartridge is located in a top position above the water line when a dispensing material therein is spent.

2. The floating dispenser of claim 1 wherein the first dispensing cartridge contains alum and minerals and the flotation member is located internal or external to either the first dispensing cartridge or the second dispensing cartridge.

3. The floating dispenser of claim 1 wherein the first dispensing cartridge contains a ballast, which may or may not contain a water affecting material and the second dispensing cartridge contains a dispensable material with the dispensable material comprising either dichlor or trichlor or both.

4. The flotation dispenser of claim 1 wherein the first dispensing cartridge is secured to a first end of the flotation member and the second dispensing cartridge is secured to an opposite end of the flotation member.

5. A floating dispenser comprising:
   a flotation member;
   a first dispensing cartridge; and
   a second dispensing cartridge rotationally engaged with the first dispensing cartridge with a rotational position of the first dispensing cartridge with respect to the second dispensing cartridge determining a dispersant rate of at least one of the cartridges when the cartridges are floating in a body of water wherein the first dispensing cartridge contains a ballast which may be an active or an inactive ballast that weighs less than the dispensable material in the second dispensing cartridge so that the floating dispenser floats with the second dispensing cartridge below a water line and inverts when the dispensable material in the second dispensing cartridge is consumed.

* * * * *